United States Patent
Lim et al.

(10) Patent No.: US 7,279,815 B2
(45) Date of Patent: Oct. 9, 2007

(54) SWING MOTOR

(75) Inventors: Jun Young Lim, Inchun-si (KR); Yo Han Lee, Seoul (KR); Sang Young Kim, Kyungki-do (KR); Myung Keun Yoo, Kyungki-do (KR); Yong Won Choi, Daejun-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/978,724

(22) Filed: Nov. 2, 2004

(65) Prior Publication Data
US 2005/0168092 A1 Aug. 4, 2005

(30) Foreign Application Priority Data
Jan. 29, 2004 (KR) ............. 10-2004-0005685

(51) Int. Cl.
*H02K 33/00* (2006.01)
(52) U.S. Cl. ..................... 310/36; 310/168
(58) Field of Classification Search .......... 310/168, 310/166, 254, 36, 216
See application file for complete search history.

(56) References Cited

U.S. PATENT DOCUMENTS

| 4,164,722 | A | * | 8/1979 | Garvey | ............ | 335/272 |
|---|---|---|---|---|---|---|
| 4,885,487 | A | * | 12/1989 | Ksovreli et al. | ............ | 310/36 |
| 4,992,685 | A | * | 2/1991 | Boon et al. | ............ | 310/37 |
| 6,809,452 | B2 | * | 10/2004 | Cho et al. | ............ | 310/216 |
| 6,870,295 | B2 | * | 3/2005 | Lim et al. | ............ | 310/216 |

FOREIGN PATENT DOCUMENTS

| JP | 56-009883 | 1/1981 |
|---|---|---|
| JP | 63-143074 | 9/1988 |
| JP | 8-136360 | 5/1996 |
| JP | 8-228466 | 9/1996 |
| JP | 2002-209369 | 7/2002 |

OTHER PUBLICATIONS

Translation of JP 63-143074, USPTO, translations branch, Jan. 23, 2007.*
English Language Abstract of JP 2002-209369.
English Language Abstract of JP 8-136360.
English Language Abstract of JP 8-228466.

* cited by examiner

*Primary Examiner*—Dang Le
*Assistant Examiner*—Nguyen N. Hanh
(74) *Attorney, Agent, or Firm*—Greenblum & Bernstein, P.L.C.

(57) ABSTRACT

A swing motor having an opening formed asymmetrically inside a stator. The swing motor is formed with an asymmetrical opening, in particular in a semicircular shape inside the stator. The opening is provided with a plurality of salient poles wound with coils. Electric current alternately flows through the coils so that a rotor, installed in the stator in a state of being spaced apart from the stator, can reciprocally move. Since the height of the stator is reduced by forming the opening asymmetrically in comparison with the case of forming the opening symmetrically, it is advantageous for minimizing the size of the product in which the swing motor is installed.

13 Claims, 7 Drawing Sheets

SWING MOTOR

BACKGROUND OF THE INVENTION

1. Field of the Invention

The present invention relates to a swing motor reciprocated within a predetermined interval, and more particularly to a swing motor adapted to an appliance restricted in height by designing a motor structure with an asymmetric opening, preferably a semicircular opening formed inside a stator of a swing motor so as to accomplish reciprocation as well as to reduce the height of the swing motor.

2. Description of the Related Art

A conventional swing motor is described with reference to FIG. 1 as follows.

The conventional swing motor, as shown in FIG. 1, includes a stator 1, a rotor 2, and a spiral spring 3. The rotor 2 is installed inside the stator 1 in a state of being spaced apart from the stator 1, and is moved reciprocally by a magnetic field generated when an electric current is applied to the stator 1. The spiral spring 3 is connected to the rotor 2 to move the rotor 2 reciprocally.

In the conventional swing motor having a structure as described above, the rotor 2 moves reciprocally within a predetermined interval by using a resonant system of the spiral spring 3 like a linear motor.

The swing motor is formed with a space, called an opening, for disposing the rotor 2 inside the stator 1 in a state of being spaced apart from the stator 1. The opening is formed with salient poles facing the rotor 2.

Since the salient poles are wound with coils, a magnetic field is generated in the stator 1 when an electric current is applied to the coils.

The operation of the swing motor will be described with reference to FIG. 2 as follows.

FIG. 2 is a cross sectional view of the stator 1 of the swing motor. As shown in FIG. 2, the stator 1 is formed with a circular opening thereinside. The opening is formed with salient poles a, b, c, and d protruding toward the rotor 2.

Moreover, the salient poles a, b, c, and d are wound with coils to connect the salient pole a with the salient pole c, and to connect the salient pole b with the salient pole d.

When an electric current is applied to the coil connecting the salient pole a with the salient pole c, magnetic flux is generated in the direction A–A'. At this time, an N-pole is generated at the salient pole a while an S-pole is generated at the salient pole c.

When an electric current is applied to the coil of the salient poles b and d, a magnetic flux is generated in the direction B–B'. At that time, the salient pole b is magnetized to have an S-pole, and the salient pole d is magnetized to have an N-pole.

According to the conventional swing motor, in the case of applying electric current to the coils wound around the stator 1, the rotor 2 does not rotate, but moves in the directions A–A' and B–B' of the magnetic field generated by the applied electric current.

Thereby, the rotor 2 rotates clockwise by a predetermined angle when the magnetic flux is generated in the direction A–A'. After this, the rotor 2 returns to the initial position. The rotor 2 rotates counterclockwise by a predetermined angle when the magnetic flux is generated in the direction B–B'.

By repeating the above movements, the swing motor moves reciprocally within the predetermined angle without a mechanical device for transforming a rotational movement into a reciprocating movement.

However, to generate magnetic flux in desired directions, the conventional swing motor is provided with the salient poles, which are formed in the opening in the stator, facing the rotor. In this case, the salient poles have a symmetrical structure such as a circular shape.

Therefore, in the case of forming the salient poles symmetrically, the stator of the swing motor must have a predetermined height. If not, the symmetric salient poles may not be formed. For this reason, the volume of the swing motor is increased, and the miniaturization of the products installed with the swing motor has reached its limits.

SUMMARY OF THE INVENTION

Therefore, the present invention has been made in view of the above and/or other problems, and it is an object of the present invention to provide a swing motor formed with an asymmetric opening such as a semicircular opening inside a stator so as to provide reciprocal movement to a rotor within a magnetic field and to reduce the height of the stator.

In accordance with the present invention, the above and other objects can be accomplished by the provision of a swing motor including a rotor being rotated by a magnetic field, a stator being formed with an asymmetric opening to rotate the rotor in right or left directions at a predetermined angle, and provided with a plurality of salient poles at the opening, coils, wound around the salient poles, for generating the magnetic field when an electric current flows, and a spiral spring, connected to the rotor, for returning the rotor to an initial position.

Preferably, the asymmetric opening in the stator has a shape formed by cutting a lower part of a polygonal shape or a semicircular shape.

According to the swing motor of the present invention, opening is provided with a plurality of salient poles, which preferably protrude toward the rotor.

The salient poles are wound with coils, respectively. If electric current alternately flows through the coils wound around the salient poles, magnetic field is generated at the stator. At this time, the magnetic field is alternately generated at the salient poles in accordance with change of the electric current so that the rotor can reciprocally move at a predetermined angle.

By simply forming two salient poles, the rotor can reciprocally move. In this case, two coils are wound around respective salient poles. The coils may be electrically connected to an electric power source by disposing a switching device such as a diode so as to apply electric power alternately to the coils.

The switching device such as a diode, connected to the electric power source, conducts electric current to the coils alternately when the alternating current electric power is positive or negative. The coils conduct so that the magnetic field is generated at one of the salient poles wound with the coils.

Since rotational torque is generated at the rotor due to the magnetic field of the salient pole, the rotor rotates at a predetermined angle. To prevent leakage of the rotational force caused by the rotational torque, the opening may be formed with slits at lower and upper central positions of the opening.

Since the magnetic field is generated only at a part of the salient pole of the semicircular opening by the slit, the other salient pole is not affected and leakage of magnetic flux can be prevented.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, embodiments of a swing motor according to the present invention will be described with reference to the accompanying drawings. Several embodiments of the present invention may be described. Since the basic structure of the swing motor is identical to the conventional swing motor, a detailed description thereof will be omitted.

Figure 1:
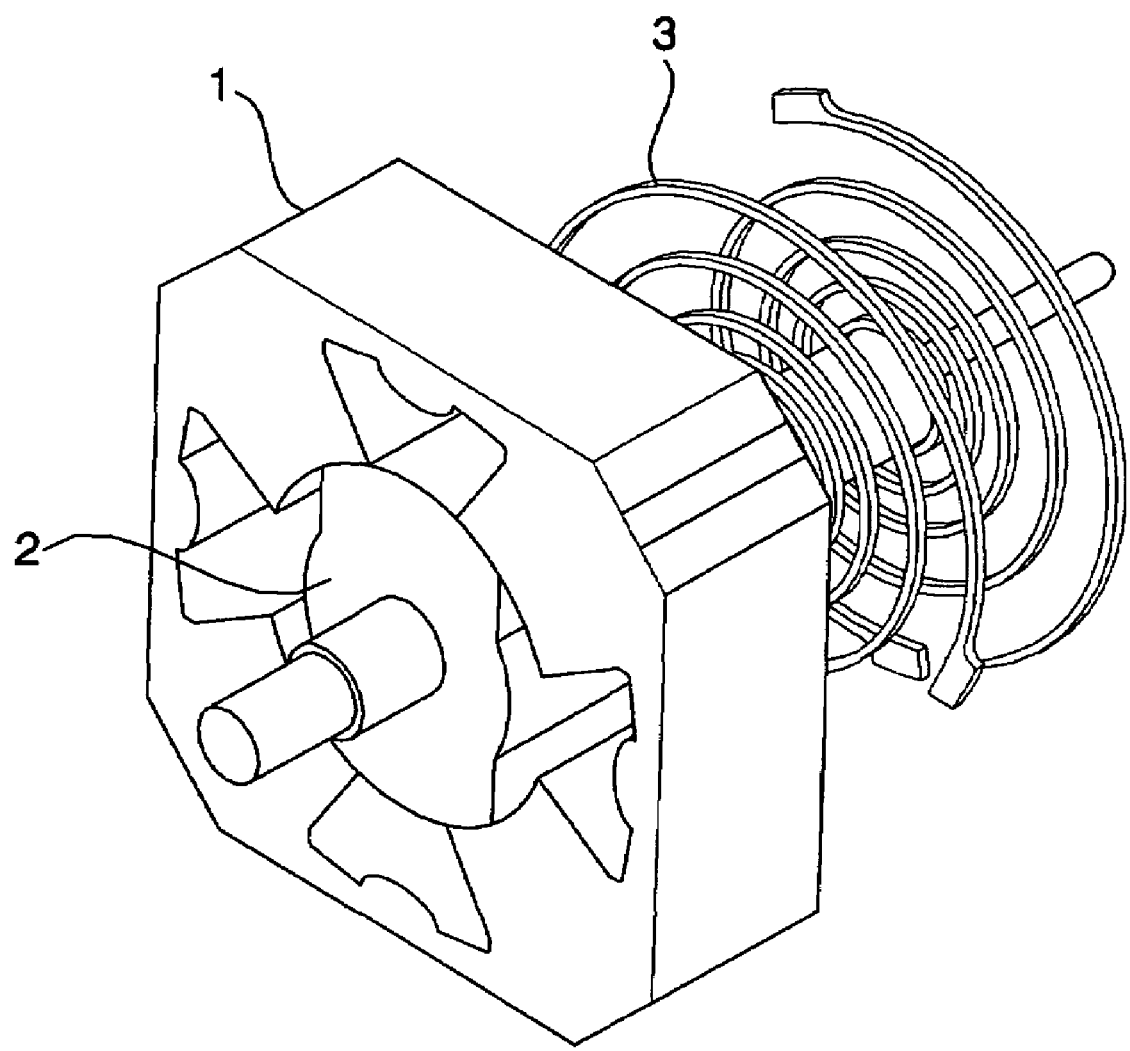
FIG. 1 is a perspective view showing a conventional swing motor.
Figure 2:
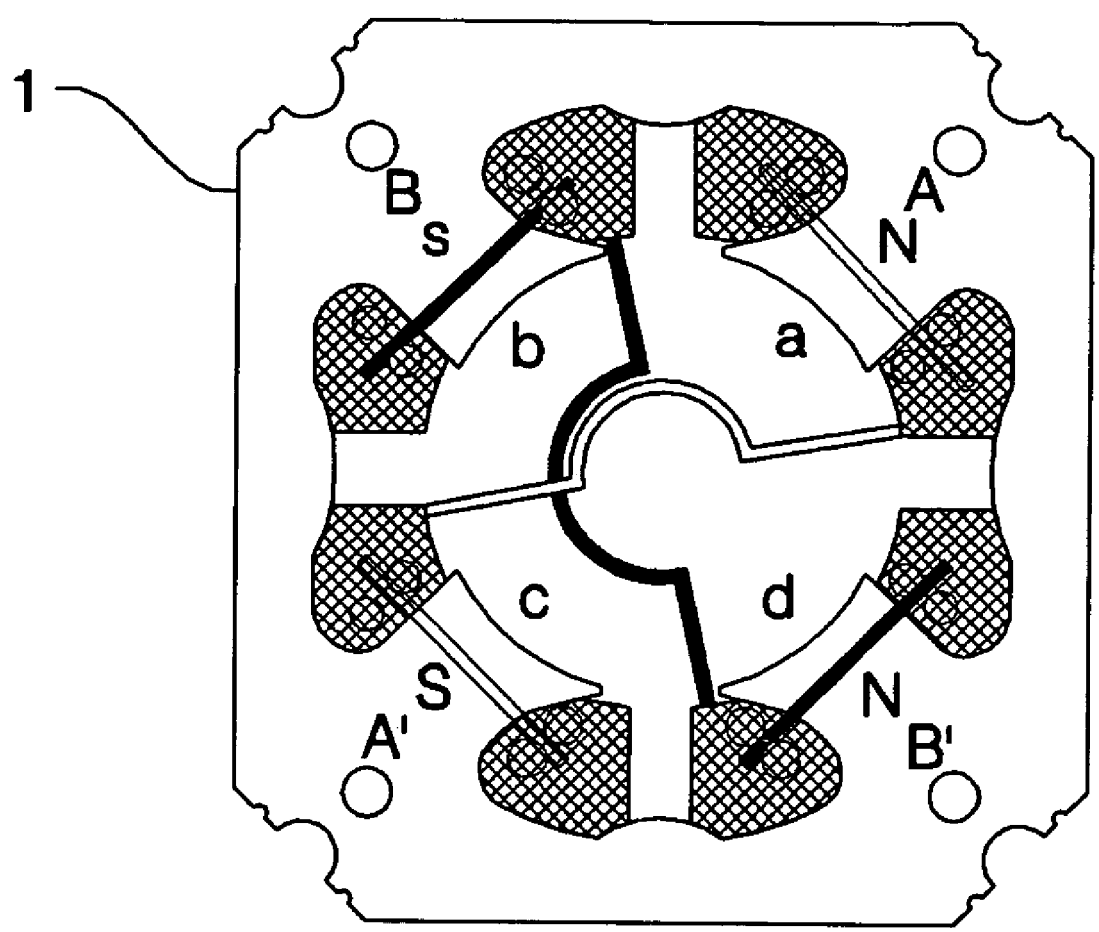
FIG. 2 is a cross sectional view of a stator of a conventional swing motor.
Figure 3:
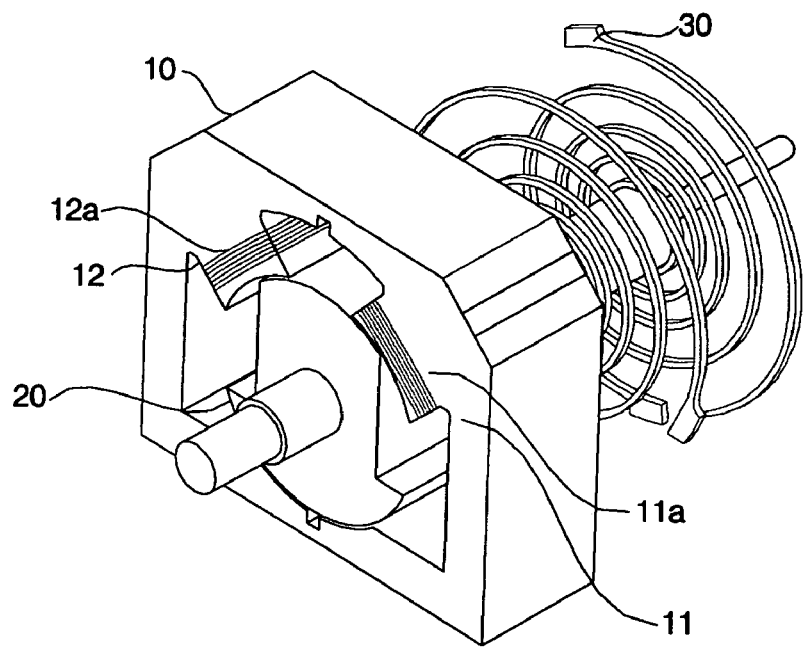
FIG. 3 is a perspective view of a swing motor according to the present invention.
Figure 4:
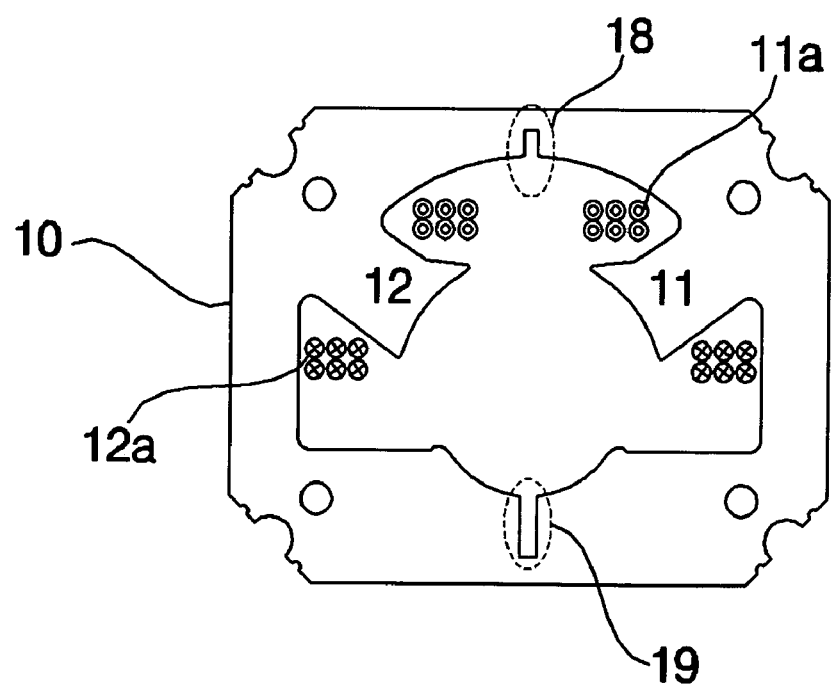
FIG. 4 is a cross sectional view of a stator of a swing motor according to a first embodiment of the present invention.
Figure 5:
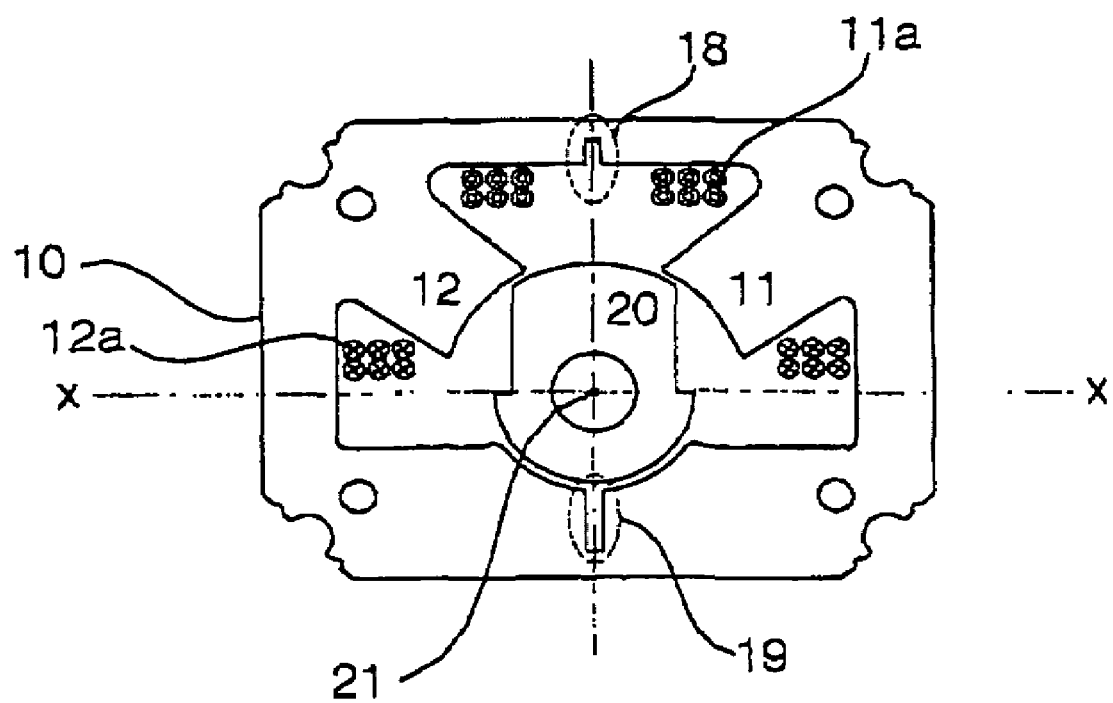
FIG. 5 is a cross sectional view of a stator of a swing motor according to a second embodiment of the present invention.

FIG. 3 is a perspective view showing a swing motor according to the present invention, FIG. 4 is a cross sectional view of a stator of the swing motor according to a first embodiment of the present invention, and FIG. 5 is a cross sectional view of the stator of the swing motor according to a second embodiment of the present invention.

Figure 6:
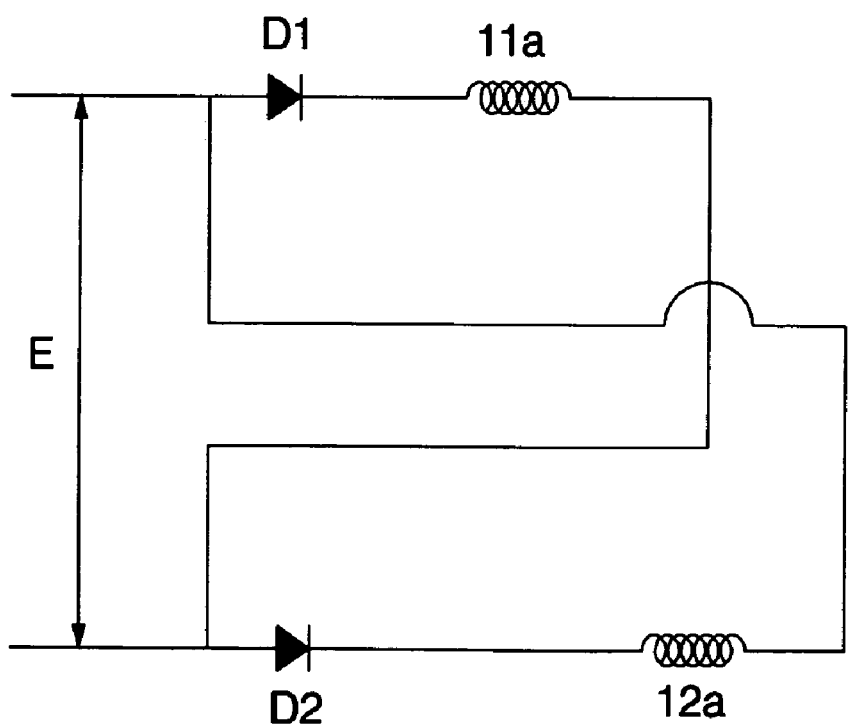
FIG. 6 is a winding circuit diagram of a swing motor according to the present invention.
Figure 7A:
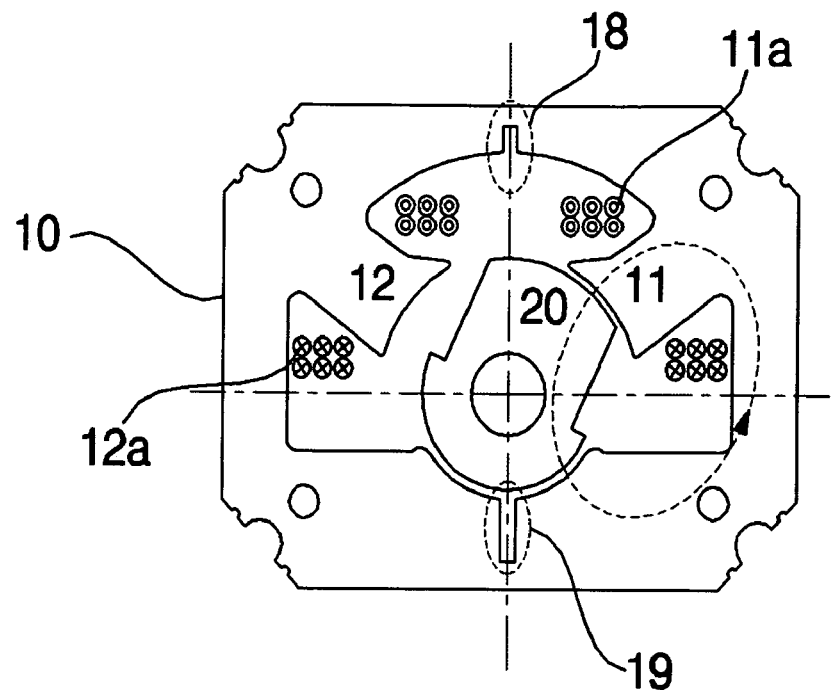
FIGS. 7a, 7b, and 7c are cross sectional views illustrating motions of a rotor of a swing motor according to the present invention.
Figure 7B:
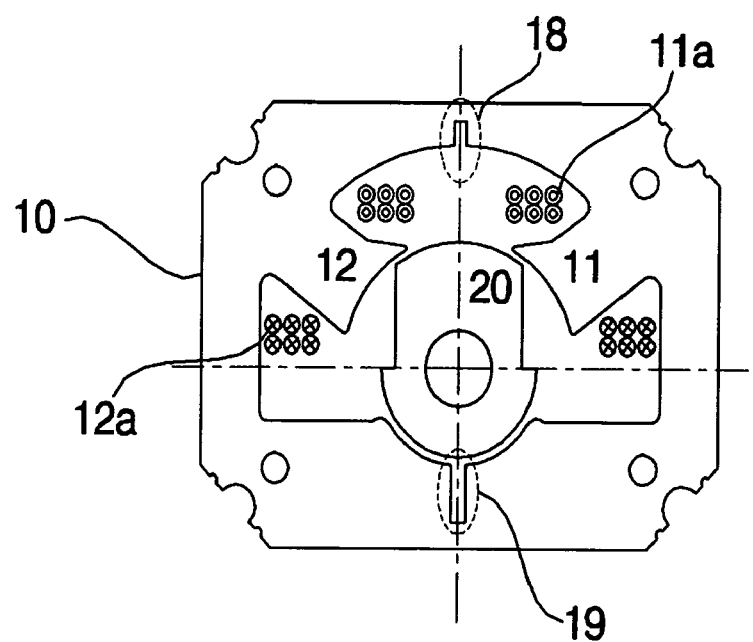
Figure 7C:
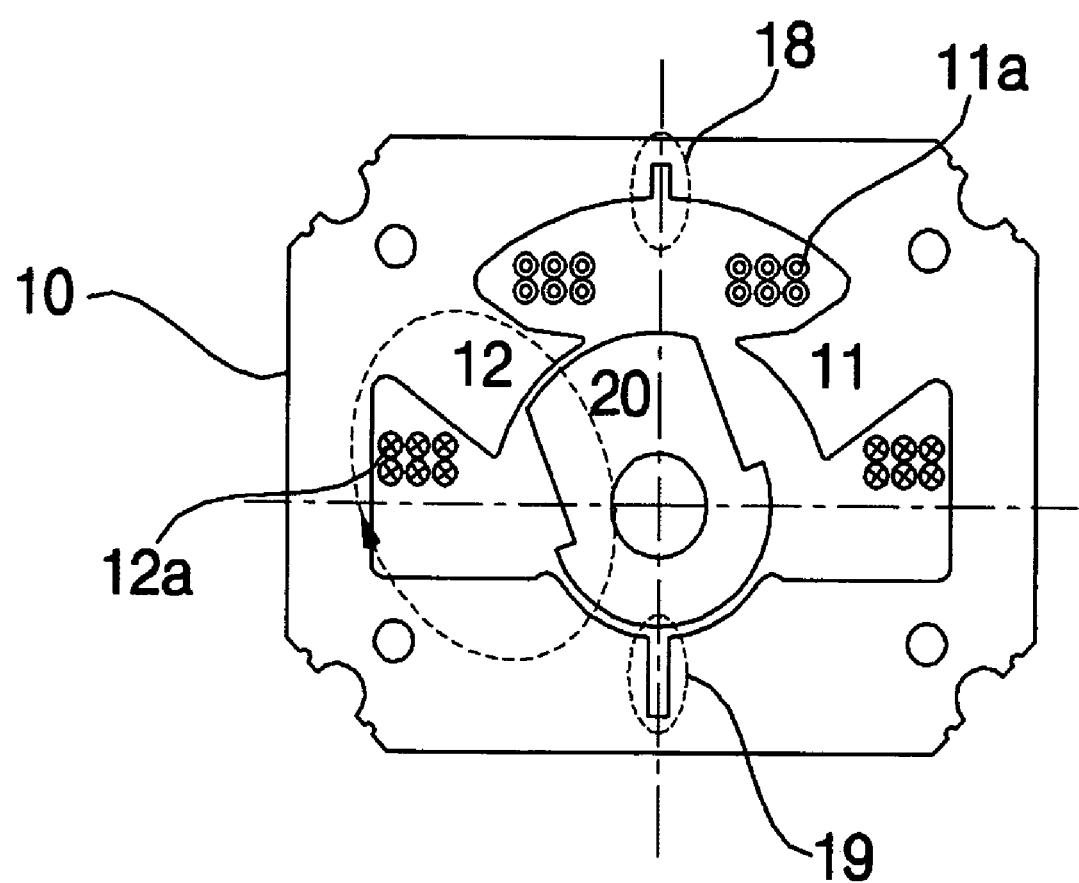

Moreover, FIG. 6 is a circuit diagram illustrating the connection of coils wound around salient poles of the swing motor according to the present invention. FIGS. 7a, 7b, and 7c are cross sectional views of the stator of the swing motor according to the present invention illustrating motions of a rotor in accordance with the application of electric current to the coils.

As shown in FIG. 3, the swing motor according to the present invention includes a stator 10, a rotor 20, and a spiral spring 30. The rotor 20 is rotated by a magnetic field generated from the stator 10. The spiral spring 30 restores the rotor 20 to an initial position and is connected with the rotor 20.

The stator 10 is formed with an asymmetric opening thereinside, and the opening is provided with a plurality of salient poles 11 and 12.

In the swing motor according to the present invention, in order to remarkably reduce the size of a product in which the swing motor is installed, the height of the swing motor can be reduced by forming the opening inside the stator 10 asymmetrically in a direction across a horizontal axis X passing through a rotation center 21 of the rotor such that the salient poles 11, 12 are disposed above the rotation center 21 of the rotor 20. The opening may be formed in a semicircular shape as a first embodiment for forming the opening asymmetrically.

Moreover, as a second embodiment of the opening, a part of a lower side of a polygonal opening is cut horizontally, and thus the opening has an asymmetric shape.

The plurality of salient poles 11 and 12 protrude toward the rotor 20. The opening is preferably formed with two salient poles 11 and 12 for the reciprocal movement of the rotor 20. Hereinafter, in the present invention, the number of the salient poles is two, i.e., a first salient pole 11 and a second salient pole 12.

The first and second salient poles 11 and 12 are wound with first and second coils 11a and 12a, respectively, and electric current flows in the coils 11a and 12a by an electric power applied to the swing motor. The electric power source is connected to a switching device. Therefore, if the electric power is alternating current, the two coils 11a and 12a alternately conduct in accordance with the change between a positive polarity and a negative polarity of the electric power source so that magnetic flux is generated.

FIG. 4 is a cross sectional view of the stator 10 of the swing motor according to the first embodiment of the present invention. As shown in the drawing, the opening has a semicircular shape, and is formed with the first and second salient poles 11 and 12. The first and second coils 11a and 12a are wound around the salient poles 11 and 12.

The stator 10 is formed with recess-shaped slits 18 and 19 at an upper central position of the opening inside the stator 10. The slits 18 and 19 serve to prevent leakage of the magnetic flux when the magnetic field is generated at the stator 10 by applying electric current to the first and second coils 11a and 12a wound around the first and second salient poles 11 and 12.

FIG. 5 is a cross sectional view of the stator 10 of the swing motor according to the second embodiment of the present invention. The stator 10 according to the second embodiment of the present invention has a structure identical to that of the stator 10 according to the first embodiment of the present invention, except that the opening has a cross section formed by cutting a part of a polygonal shape.

FIG. 6 is a circuit diagram illustrating a circuit in which an alternating current electric power E is applied to the first and second coils 11a and 12a wound around the first and second salient poles 11 and 12 in the opening. Since the circuit is provided with diodes D1 and D2, the first and second coils 11a and 12a are alternately conducted by the electric current, respectively.

The diode D1, which is connected to the first coil 11a wound around the first salient pole 11, conducts when the alternating current electric power E is positive. At that time, electric current flows through the first coil 11a so as to generate the magnetic field at the first salient pole 11. On the contrary, if the alternating current electric power E is negative, electric current flows through the second coil 12a wound around the second salient pole 12. Therefore, the magnetic field is generated at the second salient pole 12. By doing this, rotational torque is generated to rotate the rotor 12.

FIGS. 7a, 7b, and 7c are cross sectional views illustrating the motions of a rotor of a swing motor according to the present invention. FIGS. 7a, 7b, and 7c are cross sectional views of a swing motor including a stator 10 and a rotor 20, and illustrate that a semicircular opening is formed inside the stator 10.

The above drawings show cross sectional views in the case of forming the opening in the semicircular shape. The cross sectional views are depicted by placing a planar surface of the opening on the ground and cutting the swing motor in a direction vertical to the ground. In this case, the vertical lengths in the cross sectional views represent the height of the swing motor.

FIG. 7a is a cross sectional view of the swing motor illustrating that the alternating current flows through a first coil 11a wound around the first salient pole 11. At this time, a magnetic field generated at a first salient pole 11 is depicted by a dotted line.

The swing motor depicted in the cross sectional views, as described above, include the stator 10 and the rotor 20. The stator 10 is formed with the opening thereinside, and the above drawings depict the opening in a semicircular shape.

The opening is provided with first and second salient poles 11 and 12. The first and second salient poles 11 and 12 are wound with the first and second coils 11a and 12a, respectively, and alternately conduct in accordance with the polarity of the alternating current power source E to be applied thereto.

The opening is provided with slits 18 and 19 at lower and upper central positions thereof. If the electric current flows through the first and second coils 11a and 12a, the magnetic field is generated only at a part of the semicircular opening.

FIGS. 7a and 7b are cross sectional views of the swing motor taken in the same direction as shown in FIG. 7a. The structure of the swing motor shown in FIGS. 7a and 7b is identical to the structure of the swing motor shown in FIG. 7a.

A zero-crossing region is a region near where the polarity of the electric power source E, applied to the first and second coils 11a and 12a, is changed from a positive polarity to a negative polarity or from a negative polarity to a positive polarity, that is, a place where the polarity of the electric power source becomes 0 (zero) (zero-crossing). FIG. 7b shows that the rotor 20 is returned to the initial position by elastic force of a spiral spring 30 due to the resonance force at the zero-crossing region.

After the first coil 11a wound around the first salient pole 11a conducts as shown in FIG. 7a, if the polarity of the alternating current power source E is changed, the second coils 12a wound around the second salient pole 12 conduct. By doing so, the rotor 20 of the swing motor is rotated at a predetermined angle in a reverse direction. FIG. 7c depicts this case.

The swing motor constructed as described above is described in detail as follows.

The swing motor according to the present invention is formed with the asymmetric-shaped opening inside the stator 10. The asymmetric-shaped opening is formed in a semicircular shape as an embodiment.

The opening of the stator 10 is installed with the rotor 20 in a state of being spaced apart from the stator 10. If the magnetic field is generated at the stator 10, the rotor 20 rotates in a right direction or a left direction due to the rotational torque caused by the magnetic field.

In order to perform this operation, the opening of the stator 10 is provided with a plurality of salient poles 11 and 12. The salient poles 11 and 12 protrude toward the rotor 20. The number of the salient poles is usually two, that is, the first salient pole 11 and the second salient pole 12 are usually provided.

In order to provide the rotational force to the rotor 20, the salient poles 11 and 12 are wound with the first and second coils 11a and 12a, respectively. If electric current flows through the coils 11a and 12a, the coils 11a and 12a alternately conduct so that the rotor 20 is reciprocally moved by the rotation in the right-side direction and the left-side direction.

Moreover, in the case that the electric current alternately flows through the coils 11a and 12a, in order to generate magnetic fields caused by the applied electric current in opposite directions to each other, the coils 11a and 12a are wound in the opposite directions, respectively. The coils 11a and 12a wound in the opposite directions are connected to each other via a switching device for alternately applying electric current to the first and second coils 11a and 12a. In other words, the coils 11a and 12a are connected to each other via the diodes D1 and D2 disposed between the power source E and the first and second coils 11a and 12a.

In the case of driving the swing motor by applying the alternating current electric power E to the swing motor, if the applied alternating current electric power E is positive, since the first diode D1 conducts, the electric current due to the electric power E flows through the first coil 11a wound around the first salient pole 11. In an embodiment shown in the drawings, the electric current flowing through the first coil 11a flows in a direction from a center of the opening to a right lower side as seen in the cross sectional view of the stator 10.

In this case, the magnetic field caused by the electric current flowing through the first coil 11a is generated in a direction represented by a dotted line in FIG. 7a. The N-pole is generated at the salient pole 11.

Moreover, if the applied alternating current electric power E is negative, the second diode D2 conducts. At that time, the electric current caused by the applied alternating current electric power E flows through the second coil 12a wound around the second salient pole 12.

In this case, the electric current flows through the second coil 12a in a direction from the center of the opening to a left lower side. This direction is opposite to the direction of the electric current when the alternating current electric power E is positive.

Therefore, the magnetic field is generated at the second salient pole 12 and the direction of the magnetic field is identical to the direction of a dotted line shown in FIG. 7c, so that the second salient pole 12 has an S-pole.

The alternating electric current electric power E is changed from positive to negative and from negative to positive alternately according to a predetermined frequency. A rotational torque is generated to rotate the rotor 20 right at a predetermined angle in accordance with the magnetic field generated at the first salient pole 11 when the alternating current electric power E is positive. When the alternating current electric power E is negative, the magnetic field is generated at the second salient pole 12 so that a rotational torque is generated to rotate the rotor 20 left at a predetermined angle.

The rotor 20 rotates right or left at a predetermined angle which ranges 0 degree to 180 degree. Due to this, the rotor 20 reciprocally moves. The predetermined angle has a large value or a small value in accordance with the magnitude of the applied alternating current electric power E and turns of the coils.

The rotor 20 is returned to the initial position by the elastic force of the spiral spring 30 due to the resonance force at the zero-crossing region where the polarity of the applied alternating current electric power E is changed from positive to negative or from negative to positive. Thereby, the reciprocation of the rotor 20 is accelerated when the direction of the movement of the rotor 20 is changed.

The semicircular opening formed inside the stator 10 may be formed with the slits 18 and 19 at the lower and upper central positions of the opening. By forming the slits 18 and 19, the magnetic field, generated by the electric current flowing through the first and second coils 11a and 12a, is prevented from leaking, so that the rotational torque caused by the magnetic field is increased and the rotational force of the rotor 20 is also increased.

As apparent from the above description, the swing motor has an asymmetric structure such as a semicircular shape, or the like, by cutting parts of the symmetrical stator and opening. As such, the swing motor can be simply constructed to reciprocally move. Therefore, the manufacturing costs as well as the height of the swing motor can be reduced so that it is possible to minimize the size of the product in which the swing motor is installed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A swing motor, comprising:
   a rotor that is rotated by a magnetic field, a lower portion of the rotor having an archiform shape;
   a stator, comprising an asymmetric opening, that rotates the rotor in right or left directions at a predetermined angle, and which is provided with a plurality of salient poles at the opening;
   coils, wound around the plurality of salient poles, that generate the magnetic field when an electric current is applied thereto; and
   a spiral spring, connected to the rotor, that returns the rotor to an initial position,
   wherein the plurality of salient poles extend toward the rotor and are disposed above a rotation center of the rotor such that the opening is asymmetrically formed in a direction across a horizontal axis passing through the rotation center of the rotor, a concave portion is recessed in a lower portion of the stator, and the lower portion of the rotor extends into the concave portion.

2. The swing motor as set forth in claim 1, wherein the opening has a semicircular cross section.

3. The swing motor as set forth in claim 2, wherein the opening is provided with two salient poles.

4. The swing motor as set forth in clam 3, wherein the coils wound around the two salient poles alternately conduct to generate a magnetic flux when the polarity of an electric power is changed from positive to negative or from negative to positive.

5. The swing motor as set forth in claim 4, wherein the stator is provided with slits at lower and upper central positions of the opening so as to generate the magnetic field only at a part of the opening when the electric current flows through the coils wound around the salient poles.

6. The swing motor as set forth in claim 1, wherein the opening has a cross section formed by cutting a part of a polygonal shape.

7. The swing motor as set forth in claim 6, wherein the opening is provided with two salient poles.

8. The swing motor as set forth in claim 7, wherein the coils wound around the salient poles alternately conduct when the polarity of the electric power is changed from positive to negative or from negative to positive so as to generate the magnetic flux.

9. The swing motor as set forth in claim 8, wherein the stator is provided with slits at lower and upper central positions of the opening.

10. The swing motor as set forth in claim 1, wherein the opening is provided with two salient poles.

11. The swing motor as set forth in claim 10, wherein the coils wound around the salient poles alternately conduct when the polarity of an applied electric power is changed from positive to negative or from negative to positive so as to generate a magnetic flux.

12. The swing motor as set forth in claim 11, wherein the stator is provided with slits at lower and upper central positions of the opening.

13. The swing motor as set forth in claim 1, wherein a space is provided between the stator and the rotor.

* * * * *